Dec. 5, 1944.  H. H. WEHRINGER  2,364,262
CORD OR CABLE TAKE-UP DEVICE
Filed July 9, 1943
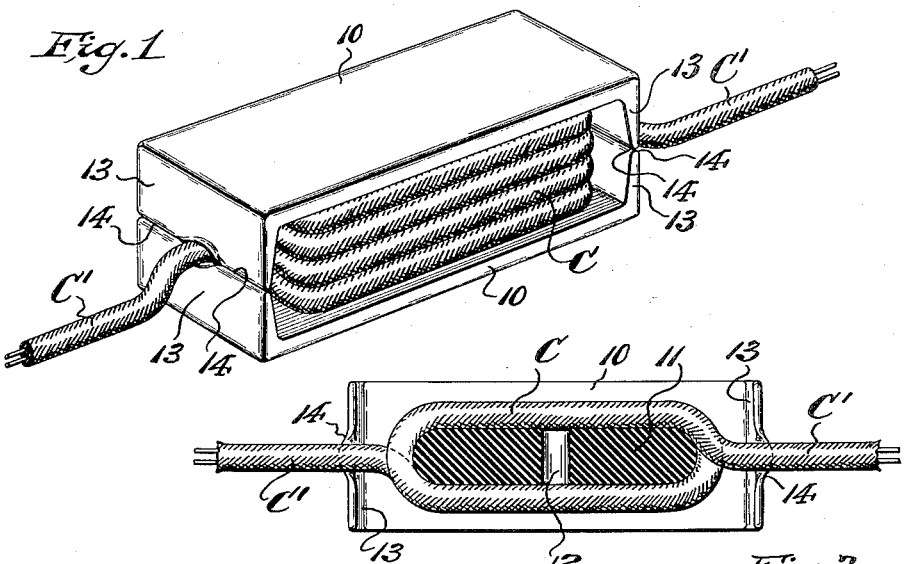
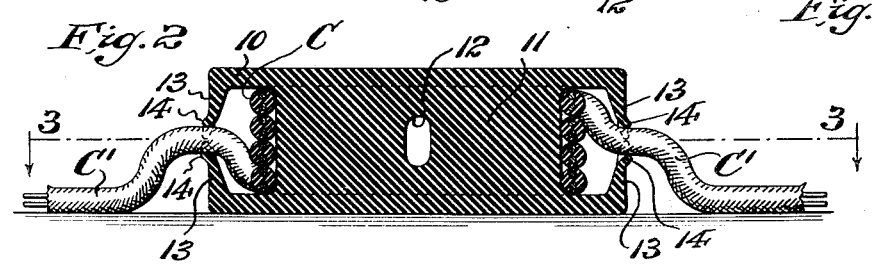
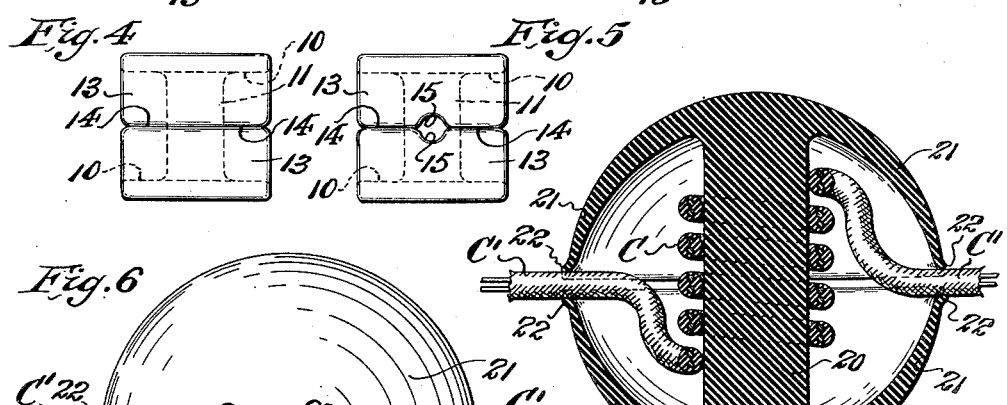
INVENTOR.
Herman H. Wehringer,
BY George S. Richards,
Attorney Patented Dec. 5, 1944

2,364,262

UNITED STATES PATENT OFFICE 2,364,262

CORD OR CABLE TAKE-UP DEVICE

Herman H. Wehringer, Montclair, N. J.

Application July 9, 1943, Serial No. 493,957

6 Claims. (Cl. 242—97)

This invention relates to improvements in take-up means for flexible cables, cords or the like; and the invention has reference, more particularly, to a novel take-up means upon which may be wound a cable, cord, electric conductor or the like, whereby to shorten the operative length of the same by winding up and compactly storing such portion thereof as may be unnecessary for its operative extension from one given point, connection or device to another.

This invention has for an object to provide a simple unitary and easily manipulated device upon which may be wound an excess portion of the length of a cable, cord, electric conductor or the like, whereby to take up and compactly and neatly store the excess length thereof not needed for its operative extension from one given point, connection or device to another; said device being provided with self-acting elastic means operative to both pass the cable, cord, conductor or the like to and from a core or spool body of the device when winding the same thereupon or unwinding it therefrom, as well as to engage or grip emergent ends of the windings, whereby to efficiently secure said windings against accidental unwinding or displacement from the stored disposition thereof within the device.

Another object of the invention is to provide a take-up device for the purposes stated which comprises a spool-like body, opposite flange portions of which include flexibly resilient opposed keeper portions between the meeting edges of which the cable, cord, conductor or the like may be passed in one direction for access to and winding upon the spool-like body, or in the opposite direction for unwinding and withdrawal from said spool-like body.

The invention has for a further object to provide a take-up device characterized as above stated, the same comprising a unitary one-piece structure made of rubber or like material.

Other objects of this invention, not at this time more particularly enumerated, will be understood from the following detailed description of the same.

Illustrative embodiments of this invention are shown in the accompanying drawing, in which:

Fig. 1 is a perspective view of one form of the novel take-up device according to this invention, with a cable or conductor wound and stored thereon, with its emergent end portions engaged by and between novel flexibly resilient opposed keeper portions with which ends of the device are provided; Fig. 2 is a central vertical longitudinal sectional view thereof; Fig. 3 is a horizontal sectional view thereof, taken on line 3—3 in Fig. 2, the cable or conductor being shown in elevation;

Fig. 4 is an end elevational view thereof, the cable or conductor being omitted; and Fig. 5 is an end elevational view similar to that of Fig. 4, but showing a somewhat modified form thereof.

Fig. 6 is an elevational view of another form of the novel take-up device embodying the principles of this invention; and Fig. 7 is a central vertical sectional view thereof.

Similar characters of reference are employed in the above-described views, to indicate corresponding parts.

In one illustrative form of the novel take-up device according to the instant invention, as shown in Figs. 1 to 5 inclusive, the same comprises a spool-like body formed by parallelly spaced, flat faced flange members 10 of substantially rectangular shape and of suitable thickness, between which extends a central shank portion 11 of reduced dimensions, that is of substantially less length and width, whereby the body is of the desired spool-like character. Said shank portion is provided with a centrally disposed transverse opening or slot 12, the purpose of which will be subsequently referred to.

Extending from opposed extremities of the end portions of said flange members 10 are transverse flexibly resilient keeper portions 13, the free margins 14 of which are opposed one to the other, substantially midway between the ends of said flange members 10 from which they spring, in either meeting or substantially meeting relation. Preferably said keeper portions 13 are of a form tapering in cross-sectional shape toward their free margins 14 so that the latter provide lip portions of maximum flexible resiliency.

In the construction of take-up device thus formed at least the keeper portions 13 are formed from flexibly resilient material, such as soft rubber or the like. Preferably, however, the entire body, including said keeper portions 13, would ordinarily be molded from rubber or like material, so as to provide the same in a unitary one-piece form.

Illustrative of one use of the take-up device, the same may be employed to take up and store an excess portion of an electric conductor cord or cable C, such e. g. as one extending from an electrical outlet to a floor lamp or other electrical fixture or device, whereby to shorten the effective length of the cord or cable, and thus eliminate unnecessary slack in its extent from outlet to lamp, and likewise preventing looping, twisting or other undesirable distortion of the cord or cable.

In applying the cord or cable to the spool-like body of the device, the end of said cord or cable may be detached from the outlet from which it extends, whereupon it may be wound lengthwise about the shank-portion 11 and between the flange members 10 of the device. During such winding, the cord or cable is aligned externally with and carried against the opposed margins 14 of the keeper portions 13, and then pressed inwardly to pass between and then behind the same, so as to be thence wound around the shank portion 11. Under the inward pressure of the cord or cable against the keeper portions 13, the latter yieldingly flex to thus separate their margins or lips 14 sufficiently to permit passage of the cord or cable inwardly therebetween.

If it is desired to apply to the take-up device a cord or cable, neither end of which is readily detachable from the devices between which the same is connected, in such event, the slack of the cord or cable may be doubled upon itself, and the bight of the loop thereof thus formed may be thereupon inserted through the opening or slot 12 of the shank portion 11, whereupon, so much of the doubled portion of the cord or cable as may be required to reduce the extent of the same to a desired length, is wound onto the device, and past the keeper portions 13 in substantially the manner already described.

After the desired excess of cord or cable has been wound about the shank portion 11 of the spool-like body, the emergent end portions C' of the wound cord or cable are carried between the opposed margins or lips 14 of the keeper portions 13 so as to be engaged and held thereby. Since said margins or lips 14 are of maximum flexibility, the same will tend to poutingly and more or less conformably surround the cord or cable so as to frictionally engage the same (see Figs. 1, 2 and 3), and thereby prevent accidental unwinding, loosening or displacement of the stored windings from the spool-like body, while at the same time said emergent end portions may be disposed and held to project centrally from the ends of the take-up device, so as to be positioned in substantial alignment with the longitudinal axis thereof and with the free length of the cord or cable. As shown, in Fig. 5, the margins or lips 14 of the keeper portions 13 may if desired be notched, as at 15, so as to straddle the emergent end portions of the cord or cable windings.

In Figs. 6 and 7 of the accompanying drawing is shown another form of the take-up device, which embodies, however, the essential structural principles of the instant invention. In this modified form of the device, the spool-like body comprises a shank portion 20 and opposed hollow semi-spherical flange members 21, thus providing a body of spherical or ball-like external form. The free annular marginal portions of said flange members 21 are opposed one to the other, and are preferably slightly spaced apart for a distance less than the thickness of a cord or cable C desired to be applied to the device. Said flange members 21 are also of a form tapering in cross-sectional shape toward their free margins 22 so that the latter provide lip portions of maximum flexible resiliency. In this modified construction of take-up device at least the lip portions 22 are formed from flexibly resilient material, such as soft rubber or the like. Preferably, however, said flange members as a whole are made of soft rubber or the like, and the shank portion 20 may optionally be made of rigid material, or of rubber; in the latter case, the device would comprise a unitary one-piece construction.

In applying the cord or cable C to the last described form of the take-up device, the cord or cable is aligned externally with and forced inwardly against the flexible lips 22 of the flange members, so that the latter yield to inward passage of said cord or cable. As the cord or cable is thus entered within the interior of the device, it may be manipulated to wind up upon the shank portion 20 thereof, whereby to take up and store so much of the length of the cord or cable as may be desired. The emergent end portions C' of the wound cord or cable will extend exteriorly and radially outward between the lip portions 22, the latter, by reason of their maximum flexible resiliency, tending to poutingly and more or less conformably surround the cord or cable, so as to frictionally engage and hold the same against accidental unwinding, loosening or displacement from the device.

From the above it will be understood that the instant invention provides a novel, very convenient and easily operated take-up device for storing excess lengths of cords, cables, etc., when it is desired to shorten the extent thereof; and, furthermore, the novel take-up device, by reason of its unitary form, eliminates necessity for use of detachable keeper elements, use of which involves more or less fussy manipulation, while also involving risk of loss and consequent impairment of the device.

I am aware that various changes could be made in the described take-up device constructions, and that widely different embodiments of this invention could be made without departing from the scope thereof as defined in the following claims. It is therefore intended that all matter contained in the foregoing description or shown in the accompanying drawing shall be interpreted as illustrative and not in a limiting sense.

I claim:

1. A take-up device comprising a spool-like body formed by spaced flange members and an intermediate shank-portion, said flange members having flexibly resilient keeper portions extending therefrom toward each other, and said keeper portions being of a cross-sectional shape tapering toward their free margins, whereby to terminate in opposed lip elements of maximum resilient flexibility disposed in substantially meeting relation.

2. A take-up device provided by a unitary spool-like body made of rubber comprising spaced flange members and an intermediate shank portion, said flange members having flexibly resilient keeper portions extending angularly therefrom toward each other, and said keeper portions being of a cross-sectional shape tapering toward their free margins, whereby to terminate in opposed lip portions of maximum resilient flexibility disposed in substantially meeting relation.

3. A take-up device comprising a spool-like body formed by spaced rectangular flat faced flange members and an intermediate shank portion of substantially less length and width, and flexibly resilient keeper means extending from opposed aligned end portions of said flange members substantially at right angles to the planes of said flange members and toward each other, with their free edges opposed in substantially meeting relation.

4. A take-up device provided by a unitary spool-like body made of rubber comprising spaced rectangular flat faced flange members and an intermediate shank portion of substantially less length and width, and flexibly resilient keeper elements extending from aligned ends of said flange members substantially at right angles to the planes of said flange members and toward each other, said keeper elements being of a cross-sectional shape tapering toward their free edges, whereby to terminate in opposed lip portions of maximum resilient flexibility disposed in substantially meeting relation.

5. A take-up device comprising a spool-like body formed by spaced rectangular flat faced flange members and an intermediate shank portion of substantially less length and width, and flexibly resilient keeper means extending from opposed marginal portions of said flange members substantially at right angles to the planes of said flange members and toward each other, with their free edges opposed in substantially meeting relation, and the opposed free edges of said keeper means having aligned indented cable or card embracing notches.

6. A take-up device provided by a unitary spool-like body made of rubber comprising spaced rectangular flat faced flange members and an intermediate shank portion of substantially less length and width, and flexibly resilient keeper elements extending from aligned ends of said flange members substantially at right angles to the planes of said flange members and toward each other, said keeper elements being of a cross-sectional shape tapering toward their free edges, whereby to terminate in opposed lip portions of maximum resilient flexibility disposed in substantially meeting relation, and said lip portions having aligned indented cable or cord embracing notches.

HERMAN H. WEHRINGER.